(12) United States Patent
Fu et al.

(10) Patent No.: US 9,801,214 B2
(45) Date of Patent: Oct. 24, 2017

(54) METHOD AND SYSTEM FOR ASSIGNING C-RNTI

(71) Applicant: China Academy of Telecommunications Technology, Beijing (CN)

(72) Inventors: Zhe Fu, Beijing (CN); Yali Zhao, Beijing (CN); Yumin Wu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 48 days.

(21) Appl. No.: 14/416,834

(22) PCT Filed: Jul. 25, 2013

(86) PCT No.: PCT/CN2013/080069
§ 371 (c)(1),
(2) Date: Jan. 23, 2015

(87) PCT Pub. No.: WO2014/015806
PCT Pub. Date: Jan. 30, 2014

(65) Prior Publication Data
US 2015/0208448 A1    Jul. 23, 2015

(30) Foreign Application Priority Data
Jul. 26, 2012   (CN) .......................... 2012 1 0262984

(51) Int. Cl.
*H04W 4/00* (2009.01)
*H04W 72/00* (2009.01)
(Continued)

(52) U.S. Cl.
CPC ........... *H04W 76/021* (2013.01); *H04W 8/26* (2013.01); *H04W 76/025* (2013.01); *H04L 5/0001* (2013.01)

(58) Field of Classification Search
CPC ... H04W 76/021; H04W 8/26; H04W 76/025; H04L 5/0001
See application file for complete search history.

(56) References Cited

U.S. PATENT DOCUMENTS

| | | | |
|---|---|---|---|
| 2010/0303039 A1* | 12/2010 | Zhang | H04L 5/0035 370/331 |
| 2011/0021191 A1 | 1/2011 | Damnjanociv et al. | |
| 2015/0043455 A1* | 2/2015 | Miklos | H04W 8/26 370/329 |

FOREIGN PATENT DOCUMENTS

| | | |
|---|---|---|
| CN | 101873614 | 10/2010 |
| CN | 101998550 | 3/2011 |

(Continued)

OTHER PUBLICATIONS

Extended European Search Report for EP Application No. 13823489.3 mailed Dec. 11, 2015.
(Continued)

*Primary Examiner* — Kiet Tang
(74) *Attorney, Agent, or Firm* — Foley & Lardner LLP; James F. Ewing

(57) ABSTRACT

Disclosed are a method and system for assigning a C-RNTI (Cell Radio Network Temporary Identity), aiming to assign the C-RNTI to UE in an aggregation scene of different eNBs by UE. The method comprises the following steps: in the scene that the User Equipment (UE) aggregating the resource of multi-eNBs, the initial access eNB and the target eNB UE aggregated respectively determine the C-RNTI which should be assigned, and then assign the determined C-RNTI respectively to the UE; or, the initial access eNB assigns the specific C-RNTI for bearer separation to UE, wherein the C-RNTI is on a presetting range of the bearer (Continued)

separation specific Radio Network Temporary Identity (RNTI) which is maintained by the eNB UE aggregated.

11 Claims, 9 Drawing Sheets

(51) Int. Cl.
*H04W 76/02* (2009.01)
*H04W 8/26* (2009.01)
*H04L 5/00* (2006.01)

(56) References Cited

FOREIGN PATENT DOCUMENTS

| | | |
|---|---|---|
| CN | 101998636 | 3/2011 |
| CN | 102006655 A | 4/2011 |
| CN | 102378394 | 3/2012 |
| CN | 102438247 | 5/2012 |
| CN | 102469557 A | 5/2012 |
| EP | 2466979 | 6/2012 |
| KR | 20110129951 | 12/2011 |
| KR | 20120025527 | 3/2012 |
| WO | WO-2011/156769 | 12/2011 |
| WO | WO-2013/104416 | 7/2013 |

OTHER PUBLICATIONS

Samsung: "Handover with CA—stage 2 level issues", 3GPP Draft; R2-103113 Handover With CA—High Level Issues, 3rd Generation Partnership Project (3GPP), Mobile Competence Centre ; 650, Route Des Lucioles ; F-06921 Sophia-Antipolis Cedex ; France, vol. RAN WG2, No. Montreal, Canada; May 5, 2010-May 14, 2010, May 3, 2010 (May 3, 2010), XP050605127, [retrieved on May 3, 2010].

"LTE Release 12 and Beyond", 3GPP Draft; RWS-120003 LTE Release 12 and Beyond, 3rd Generation Partnership Project (3GPP), Mobile Competence Centre ; 650, Route Des Lucioles ; F-06921 Sophia-Antipolis Cedex; France No. Ljubljana, Slovenia; Jun. 11, 2012-Jun. 12, 2012 Jun. 1, 2012 (Jun. 1, 2012 ), XP050655092, Retrieved from the Internet: URL:http://www.3gpp.org/ftp/workshop/2012-06-11_12_RAN_REL12/Docs/ [retrieved on Jun. 1, 2012].

Office Action for Chinese Patent Application No. 201210262984.1 mailed Dec. 24, 2015 (including English summary).

"3rd Generation Partnership Project; Technical Specification Group RAN; UMTS and LTE; Mobility Enhancements for H(e)NB (Release 11)" 3GPP Standard; 3GPP TR 37.803, 3$^{rd}$ Generation Partnership Project (3GPP), Mobile Competence Centre ; 650, Route Des Lucioles ; F-06921 Sophia-Antipolis Cedex ; France, vol. RAN WG3, No. V2.0.0, Jun. 15, 2012 (Jun. 15, 2012), pp. 1-124, XP050580678, [retrieved on Jun. 15, 2012].

Mieszko Chmiel et al: 11 LTE-Advanced "In: 11 LTE for UMTS: Evaluation to LTE-Advanced", Mar. 4, 2011 (Mar. 4, 2011), John Wiley and Sons, XP055202498, ISBN: 978-0-47-066000-3 pp. 487-513, DOI: 10.1002/9781119992943.ch16.

Partial Supplementary European Search Report for European Patent Application No. 13823489.3 mailed Jul. 28, 2015.

Office Action for Korean Patent Application No. 10-2015-7004597 mailed Oct. 15, 2015 (including English summary).

International Search Report for PCT/CN2013/080069 mailed Nov. 7, 2013.

\* cited by examiner

METHOD AND SYSTEM FOR ASSIGNING C-RNTI

This application is a US National Stage of International Application No. PCT/CN2013/080069, filed on Jul. 25, 2013, designating the United States and claiming priority to Chinese Patent Application No. 201210262984.1, filed with the Chinese Patent Office on Jul. 26, 2012 and entitled "Method and system for allocating C-RNTI", the content of which is hereby incorporated by reference in their entireties.

FIELD

The present invention relates to the field of communications and particularly to a method and system for allocating a C-RNTI.

BACKGROUND

FIG. 1 illustrates the network architecture of an Evolved Universal Terrestrial Radio Access (E-UTRAN) composed of evolved Node Bs (eNBs). An eNB functions as an access network and communicates with a User Equipment (UE) via an air interface. There are both a control plane connection and a user plane connection between the UE and the eNB. Each UE attached to the network is served by a Mobility Management Entity (MME), the MME connected with the eNB via a control plane S1 interface (that is, S1 for the control plane, S1-MME). The S1-MME interface provides the UE with a service on the control plane, including mobility management and bearer management functions. An S-GW is connected with the eNB via a user plane S1 interface (that is S1 for the user plane, S1-U), and each UE attached to the network is served by an S-GW. The S1-U interface provides the UE with a service on the user plane, and user plane data of the UE is transmitted between the S-GW and the eNB over an S1-U bearer.

With rapid development of smart terminals and a constantly growing demand of the rate of data services and the capacity of data services required by the users, the conventional macro eNB single-layer coverage network has failed to accommodate such a situation. In view of this, layered network deployment has been introduced in the 3$^{rd}$ Generation Partnership Project (3GPP) so that some eNBs with low power (including femto cellular eNBs, pico eNBs, relays and in other forms) are deployed in a hotspot area, an indoor environment at home, an office environment and other small-coverage environments for an effect of splitting a cell so that an operator can provide the users with services at a higher data rate and a lower cost.

In the conventional layered network as illustrated in FIG. 2, a macro eNB provides underlying coverage, a small eNB with low power (referred in this context to as a local eNB) provides hotspot coverage, there is a data/signaling interface (which may be a wired/wireless interface) between the local eNB and the macro eNB, and the UE may operate while being served by the macro eNB or the local eNB. Due to a small coverage area of a cell controlled by the local eNB, and a small number of UEs served by the local eNB, the UE connected with the local eNB tends to be provided with a better quality of service, e.g., a higher traffic rate, a link with a higher quality, etc. Thus when the UE connected with the macro eNB enters the coverage area of the cell associated with the local eNB, the UE can be handed over to the local eNB to be served by the local eNB; and when the UE is far away from the coverage area of the cell associated with the local eNB, the UE needs to be handed over to a cell controlled by the macro eNB to keep wirelessly connected.

Separation of a user bearer can be supported in the network architecture illustrated in FIG. 2. In the area covered by both the cell of the macro eNB and the cell of the local eNB, the corresponding bearer of the UE can be scheduled and transmitted by the different eNBs. Particularly the network architecture where the user plane is separated from the control plane (CP/UP separation) will be exemplified below. In this approach, when the UE is located in the area covered only by the cell of the macro eNB, both the control plane connection and the user plane connection of the UE are active at the macro eNB, and when the UE moves to/approaches the area covered by both the cell of the macro eNB and the cell of the local eNB, (all or a part of) the user plane bearer connection of the UE is handed over to the local eNB for a higher traffic transmission rate; whereas the control plane connection of the UE remains connected to the macro eNB to thereby lower a signaling overhead due to frequent switching.

In order to enhance mobility management or improve a peak rate in layered network deployment, resources of cells of multiple eNBs may be aggregated for a UE and scheduled separately by the respective eNB. Scheduling is performed with addressing based upon Cell-Radio Network Temporary Identities (C-RNTIs) which identify UEs with Radio Resource Control (RRC) connections in a cell and which are allocated by the respective eNBs in the Long Term Evolution (LTE) system to uniquely identify respective UEs in a cell. Typically when a UE initiates an RRC connection or is being switched, an eNB allocates a dedicated C-RNTI to the UE. The C-RNTI is primarily configured to scramble dynamic scheduling of a Physical Downlink Control Channel (PDCCH) indicator, to scramble an uplink channel, to perform random access and switching procedures triggered by a PDCCH command, etc.

However the Long Term Evolution-Advanced (LTE-A) Release 11 (R11) and earlier versions only support aggregation of carriers served by the same eNB for a UE and allocation of a C-RNTI by the eNB for the UE. In the layered network deployment scenario including a local eNB and a macro eNB, particularly in the architecture where a bearer is separated, carriers/serving cells from different eNBs may be aggregated concurrently for the UE in order to serve the UE. For the different eNBs aggregated for the UE, there has been absent in the prior art a solution to allocation of a C-RNTI to such a UE in this scenario for dynamic scheduling and other procedures.

SUMMARY

Embodiments of the invention provide a method and system for allocating a C-RNTI so as to allocate a C-RNTI for a UE in the scenario where different eNBs are aggregated for the UE.

An embodiment of the invention provides a method for allocating a C-RNTI in a scenario where cell resources of a plurality of base stations are aggregated for a UE, wherein the method includes:

allocating, by an initial access base station, to the UE a dedicated C-RNTI of bearer separation for use in a state of bearer separation, wherein the dedicated C-RNTI of bearer separation belongs to a set of dedicated RNTIs of bearer separation maintained jointly by the base stations aggregated for the UE; and notifying, by the initial access base station, the UE and a base station aggregated with the initial access base station respectively of the C-RNTI.

An embodiment of the invention provides another method for allocating a C-RNTI in a scenario where cell resources of a plurality of base stations are aggregated for a UE, wherein the method includes:

determining, by an initial access base station of the UE and a destination base station aggregated for the UE, C-RNTIs to be allocated by the initial access base station and the destination base station to the UE respectively; and allocating, by the initial access base station of the UE and the destination base station aggregated for the UE, the C-RNTIs determined by the initial access base station of the UE and the destination base station to the UE respectively.

An embodiment of the invention provides a base station, wherein the base station includes:

an allocating unit configured, in a scenario where cell resources of a plurality of base stations are aggregated for a UE, to allocate a dedicated C-RNTI of bearer separation to the UE, wherein the dedicated C-RNTI of bearer separation belongs to a set of dedicated RNTIs of bearer separation maintained jointly by the base stations aggregated for the UE; and a notifying unit configured to notify the UE and another base station aggregated with the initial access base station of the dedicated C-RNTI of bearer separation.

An embodiment of the invention provides a system for allocating a C-RNTI, wherein the system includes:

an initial access base station of a UE and a destination base station aggregated for the UE, wherein:

each base station is configured to allocate a C-RNTI corresponding to the base station respectively to the UE in a scenario where cell resources of a plurality of base stations are aggregated for the UE.

As can be apparent from the technical solutions above, in the scenario where cell resources of a plurality of base stations are aggregated for the UE, a C-RNTI can be allocated in two different manners: the initial access base station allocates a dedicated C-RNTI of bearer separation to the UE; or the different base stations aggregated for the UE determine C-RNTIs to be allocated by the respective base stations for the UE, and the base stations aggregated for the UE allocate the C-RNTIs determined by the respective base stations to the UE. There is a solution to allocation of a C-RNTI in the scenario where different base stations are aggregated for the UE.

DETAILED DESCRIPTION OF THE EMBODIMENTS

Embodiments of the invention propose a solution to allocation of C-RNTI's to a UE, by different eNB's aggregated for the UE, for dynamic scheduling and other procedures in the scenario of layered network deployment where cell resources of the multiple eNB's are aggregated for the UE, particularly in the architecture where bearer splitting is supported.

Figure 1:
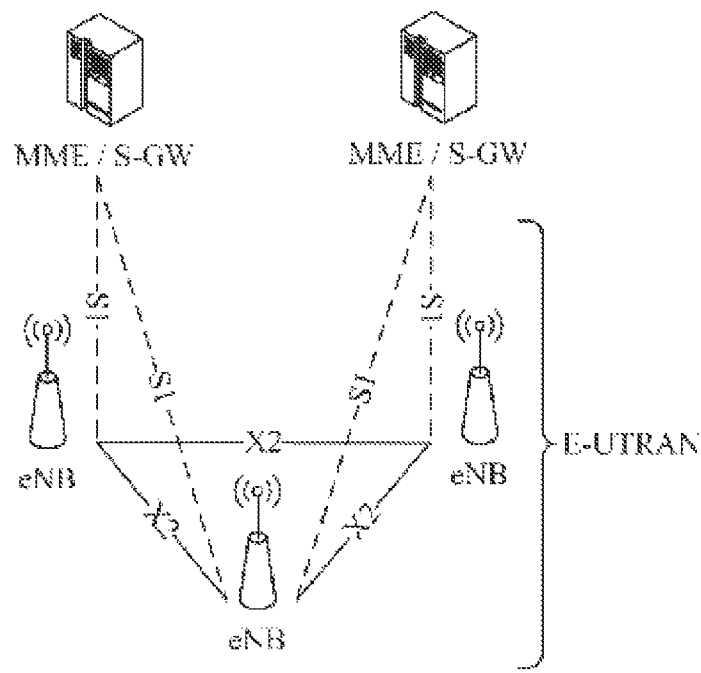
FIG. 1 is a network architectural diagram of an E-UTRAN in the prior art.
Figure 2:
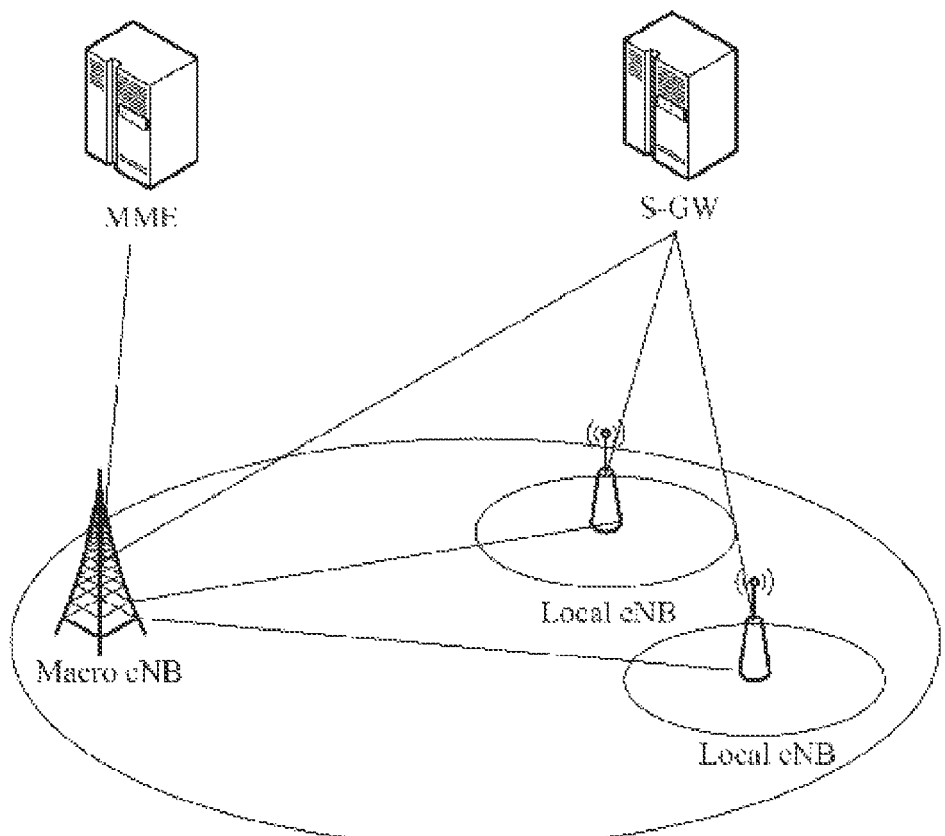
FIG. 2 is a diagram of a layered network deployment scenario in the prior art.
Figure 3:
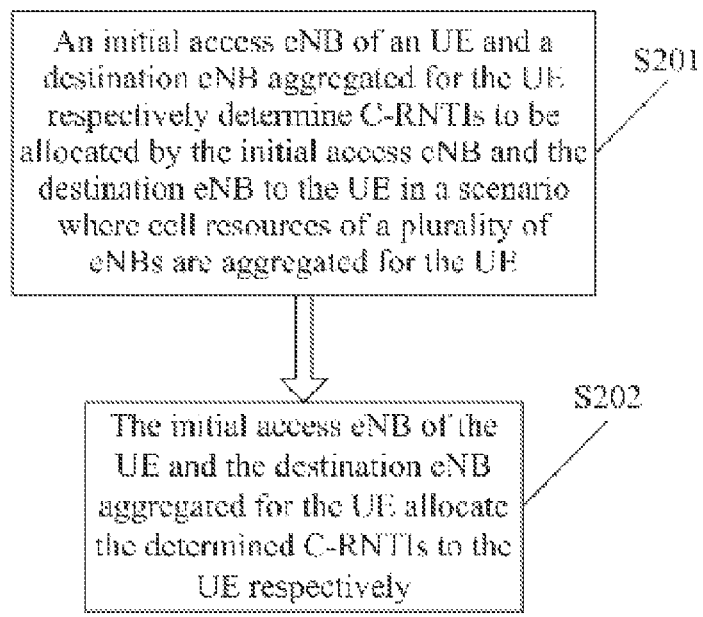
FIG. 3 is a schematic flow chart of a method for allocating a C-RNTI according to an embodiment of the invention.

Referring to FIG. 3, an embodiment of the invention provides a method for allocating a C-RNTI, the method including the operations of:

S201: An initial access eNB of an UE and a destination eNB aggregated for the UE determine C-RNTIs to be allocated respectively by the access eNB and the destination eNB to the UE in a scenario where cell resources of a plurality of eNBs are aggregated for the UE; and S202: The initial access eNB of the UE and the destination eNB aggregated for the UE allocate the C-RNTIs determined respectively by the access eNB and the destination eNB to the UE. Preferably the scenario is a scenario of layered network deployment where bearer separation is supported.

In the scenario of layered network deployment where bearer separation is supported, in a procedure of bearer separation, the aggregated destination eNB allocates the C-RNTI corresponding to the destination eNB to the UE and notifies the UE of the C-RNTI through the initial access eNB; or in the procedure of bearer separation and in a random access procedure initiated by the UE to the aggregated destination eNB, the aggregated destination eNB allocates the C-RNTI corresponding to the destination eNB to the UE.

An embodiment of the invention provides another method for allocating a C-RNTI, the method including the steps of:

In a scenario where cell resources of a plurality of eNBs are aggregated for a UE, an initial access eNB allocates to the UE a dedicated C-RNTI of bearer separation for use in a state of bearer separation, where the dedicated C-RNTI of bearer separation belongs to a set of dedicated C-RNTIs of bearer separation maintained jointly by the eNBs aggregated for the UE; and The initial access eNB notifies the UE and an eNB aggregated with the initial access eNB respectively of the C-RNTI.

In a scenario of layered network deployment where bearer separation is supported, when an initial Radio Resource Control (RRC) connection is set up or in a process of bearer separation, the initial access eNB allocates the dedicated C-RNTI of bearer separation to the UE.

In the state of bearer separation, the aggregated destination eNB communicates using the dedicated C-RNTI allocated by the initial access eNB to the UE for use in the state of bearer separation, and the initial access eNB also communicates using the dedicated C-RNTI; or In the state of bearer separation, the aggregated destination eNB communicates using the dedicated C-RNTI allocated by the initial access eNB to the UE for use in the state of bearer separation, and the initial accessed eNB still communicates using a C-RNTI by the initial access eNB allocated to the UE in a procedure of initial connection setup initiated by the UE.

Several particular embodiments will be described below.

In a particular embodiment, a macro eNB and a local eNB allocate C-RNTIs corresponding to the macro eNB and the local eNB respectively to a UE. In a procedure of bearer separation, a destination eNB (e.g., the local eNB) allocates a C-RNTI to the UE for use in a corresponding cell and notifies an initial access eNB of the UE (e.g., the macro eNB) via an interface between the eNBs and then notifies the UE through the initial access eNB.

Figure 4:
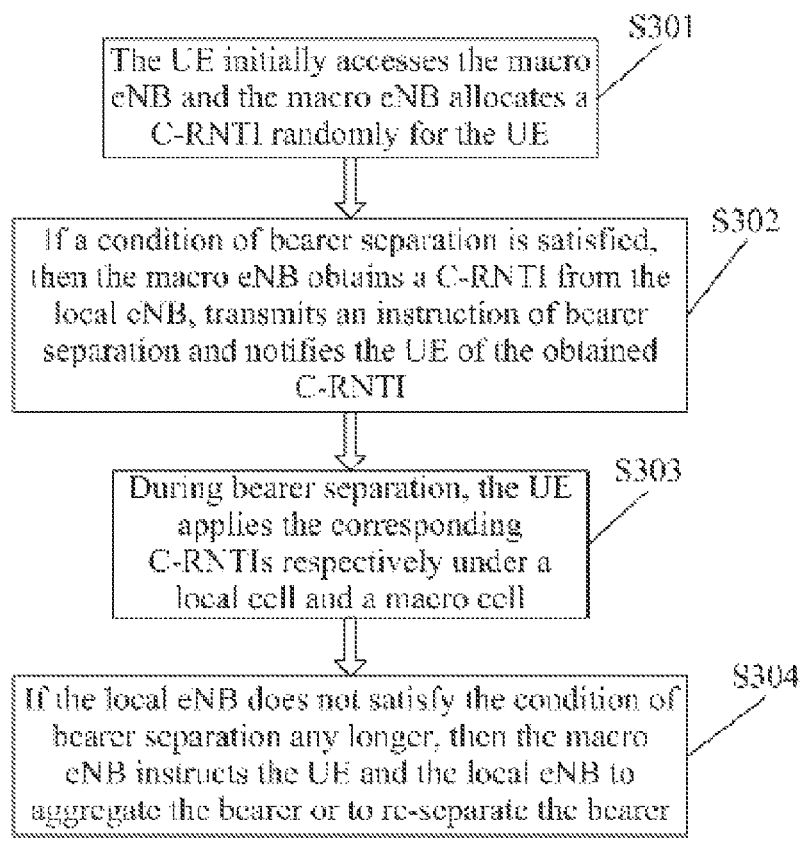
FIG. 4 is a schematic flow chart of a method for allocating a C-RNTI according to an embodiment of the invention.

Referring to FIG. 4, there are particular operations of:

S301: The C-RNTI is initially allocated.

In the case that the macro eNB, which is the eNB initially accessed by the UE, allocate the C-RNTI to the UE, the macro eNB can allocate a dedicated C-RNTI to the UE under an existing rule, for example, the macro eNB can allocate the dedicated C-RNTI randomly to the UE. While the UE maintains the RRC connection, the macro eNB performs dynamic scheduling and other operations on the UE over a PDCCH scrambled by the C-RNTI.

S302: The C-RNTI is allocated in bearer separation.

When a condition of bearer separation is satisfied, the macro eNB issues a bearer separation instruction between eNBs with respect to some UE (in a message including configuration information of a bearer to be handed over in bear separation, the identity of the UE, etc.) to the local eNB via an interface between the eNBs to request the local eNB for allocating to the UE a dedicated C-RNTI of the UE being served by the local eNB. Thereafter the local eNB interacts with the macro eNB to transfer the C-RNTI, which is allocated by the local eNB for the UE, to the macro eNB. The macro eNB transmits an instruction of bearer separation to the UE and notifies the UE of the received C-RNTI which is allocated by the local eNB to the UE. The notification can be performed in a procedure of RRC connection reconfiguration or in another newly defined manner.

S302: The C-RNTIs are used.

In a state of bearer separation, the macro eNB and the local eNB perform dynamic scheduling and other procedures respectively using the C-RNTIs allocated by the macro eNB and the local eNB to the UE. Correspondingly the UE performs de-scrambling on PDCCH, scrambling on Physical Uplink Control Channel (PUCCH)/Physical Uplink Shared Channel (PUSCH) and other operations using the corresponding C-RNTIs in the state of bearer separation respectively under the local and macro eNBs.

S304: The C-RNTI is reclaimed.

The macro eNB issues an instruction of bearer aggregation or an instruction of bearer re-separation to the UE upon determining that the local eNB does not satisfy the condition of bearer separation any longer, and the UE performs a corresponding operation (for example, deletes the C-RNTI corresponding to the original local eNB) upon reception of the instruction. In the meantime, an eNB which maintains RRC connection (i.e., the macro eNB) instructs the local eNB via the interface between the eNBs to initiate a procedure of bearer aggregation or a procedure of bearer re-separation with respect to the corresponding UE. The local eNB reclaims the C-RNTI previously allocated by the local eNB to the UE and performs another corresponding operation upon reception of the instruction.

In the procedure of bearer re-separation, firstly the Radio Bearer (RB) handed over in the procedure of bearer separation is handed back over to the macro eNB, and then a part/all of a Data Radio Bearer (DRB) is handed again over to another local eNB via a new instruction of bearer separation; or a part/all of the RB handed over in the procedure of bearer separation is handed directly over to the other local eNB.

In a second embodiment, a macro eNB and a local eNB allocate C-RNTIs corresponding to the macro eNB and the local eNB respectively to a UE. In a procedure of bearer separation, a destination eNB (e.g., the macro eNB) allocates a C-RNTI to the UE for use in a corresponding cell and notifies an initial access eNB of the UE (e.g., the local eNB) via an interface between the eNBs and then notifies the UE through the initial access eNB.

Figure 5:
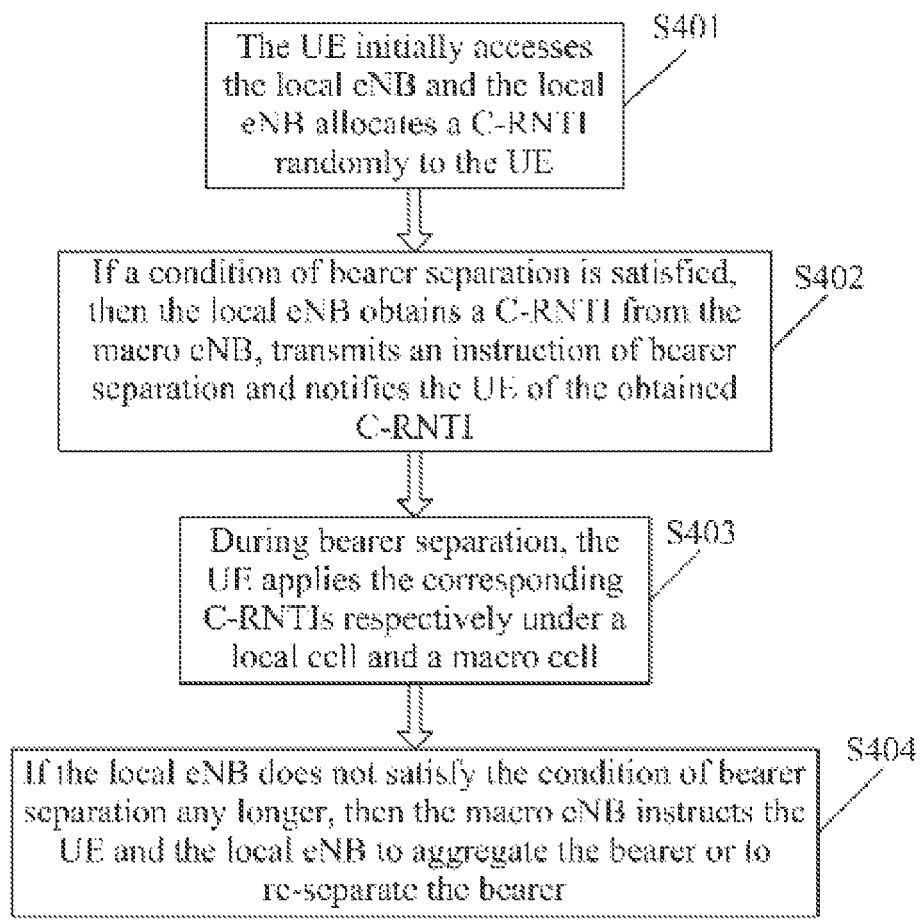
FIG. 5 is a schematic flow chart of a method for allocating a C-RNTI according to an embodiment of the invention.

Referring to FIG. 5, there are particular operations of:

S401: The C-RNTI is initially allocated.

In the case that the macro eNB, which is the eNB initially accessed by the UE, allocate the C-RNTI to the UE, the macro eNB can allocate a dedicated C-RNTI to the UE under an existing rule.

S402: The C-RNTI is allocated in bearer separation.

When a condition of bearer separation is satisfied, firstly the local eNB switches the UE to the macro eNB in a switching procedure, and then the macro eNB initiates a procedure of bearer separation; or the local eNB initiates the procedure of bearer separation directly. In the event that the UE is firstly switched to the macro eNB, bearer separation and use of the C-RNTIs will be the same as in the first embodiment. The following description will be made only of the procedure of bearer separation being initiated directly by the local eNB.

The local eNB issues an instruction of bearer separation between eNBs with respect to some UE (in a message including configuration information of an SRB or another bearer to be handed over in bear separation, the identity of the UE, etc.) to the macro eNB via an interface between the eNBs to request the macro eNB for allocating to the UE a dedicated C-RNTI of the UE being served by the macro eNB. Thereafter the macro eNB interacts with the local eNB to transfer the C-RNTI, which is allocated by the macro eNB for the UE, to the Local eNB. The local eNB transmits an instruction of bearer separation to the UE and notifies the UE of the received C-RNTI which is allocated by the macro eNB for the UE. The notification can be performed in a procedure of RRC connection reconfiguration or in another newly defined manner.

S403: The C-RNTIs are used.

In a state of bearer separation, the macro eNB and the local eNB perform dynamic scheduling and other procedures respectively using the C-RNTIs allocated by the macro eNB and the local eNB for the UE. Correspondingly the UE performs de-scrambling on PDCCH, scrambling on PUCCH/PUSCH and other operations using the corresponding C-RNTIs in the state of bearer separation respectively under the local eNB and macro eNB.

S404: The C-RNTI is reclaimed.

The macro eNB issues an instruction of bearer aggregation or an instruction of bearer re-separation to the UE upon determining that the local eNB does not satisfy the condition of bearer separation any longer, and the UE performs a corresponding operation (for example, deletes the C-RNTI corresponding to the original local eNB) upon reception of the instruction. In the meantime, the eNB which maintains the RRC connection (i.e., the macro eNB) instructs the local eNB via the interface between the eNBs to initiate a procedure of bearer aggregation or a procedure of bearer re-separation with respect to the corresponding UE. The local eNB reclaims the C-RNTI previously allocated by the local eNB to the UE and performs another corresponding operation upon reception of the instruction.

In a third embodiment, a macro eNB and a local eNB allocate C-RNTI's corresponding to the macro eNB and the local eNB respectively for a UE. The local eNB allocates for the UE a dedicated C-RNTI of the UE being served by the local eNB when the UE initiates a local RA.

Figure 6:
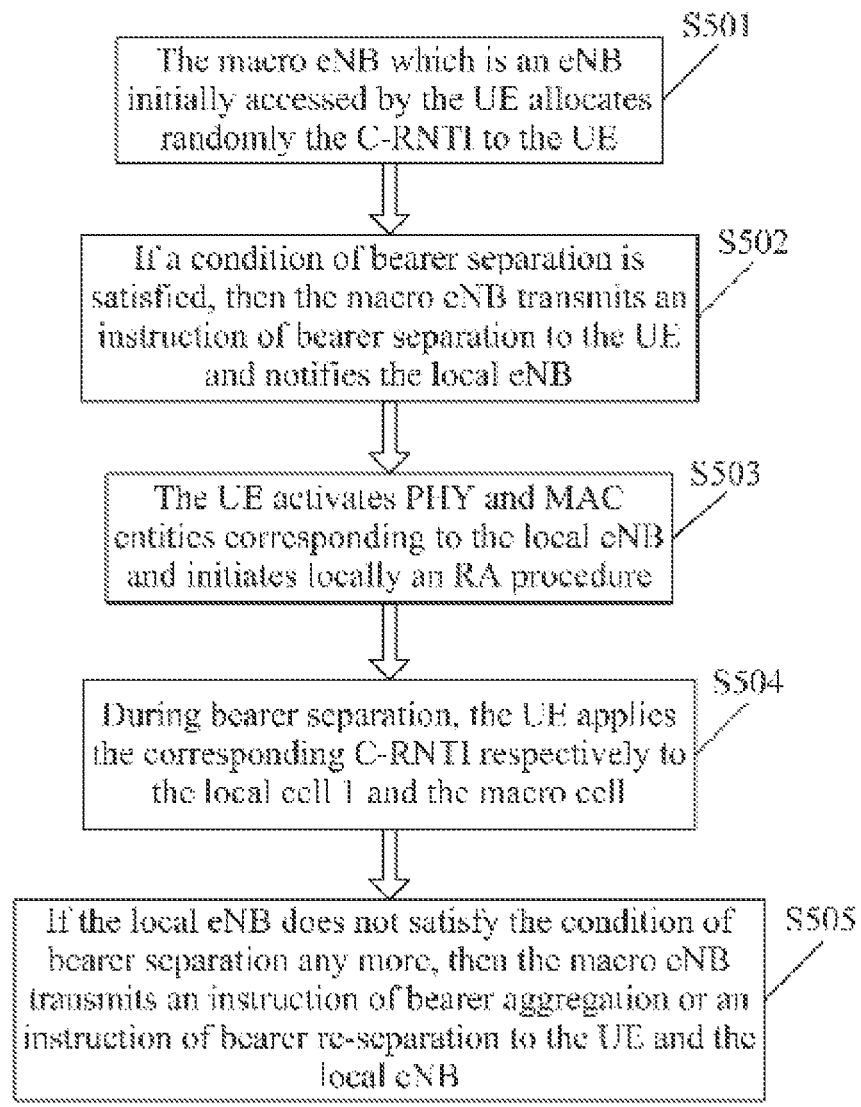
FIG. 6 is a schematic flow chart of a method for allocating a C-RNTI according to an embodiment of the invention.

Referring to FIG. 6, there are particular operations of:

S501: The C-RNTI is initially allocated.

In the case that the macro eNB, which is an eNB initially accessed by the UE, allocates the C-RNTI to the UE, the macro eNB can allocate the dedicated C-RNTI for the UE under an existing rule. While the UE maintains RRC connection, the macro eNB performs dynamic scheduling and other operations on the UE over a PDCCH scrambled by the C-RNTI.

S502: Bearer separation is instructed to be performed.

When a condition of bearer separation is satisfied, the macro eNB issues an instruction of bearer separation between eNBs with respect to some UE (in a message including configuration information of a bearer to be handed over in bear separation, the identity of the UE, etc.) to the local eNB via an interface between the eNBs. In the meantime, the macro eNB transmits an instruction of bearer separation to the UE.

S503: The UE initiates a Radio Access (RA) procedure.

The UE performs a corresponding operation, for example, activates another set of Physical Layer (PHY) and Medium Access Control (MAC) entities corresponding to the local eNB, upon reception of the instruction and thereafter initiates the RA procedure to the local eNB through the set of PHY and MAC entities corresponding to the local eNB. The local eNB allocates to the UE a dedicated C-RNTI of the UE being served by the local eNB in the random access procedure initiated by the UE.

S504: The C-RNTIs are used.

In a state of bearer separation, the macro eNB and the local eNB perform dynamic scheduling and other procedures respectively using the C-RNTIs allocated by the macro eNB and the local eNB to the UE. Correspondingly the UE performs de-scrambling on PDCCH, scrambling on PUCCH/PUSCH and other operations using the corresponding C-RNTIs in the state of bearer separation respectively under the local eNB and macro eNB.

S505: The C-RNTI is reclaimed.

The macro eNB issues an instruction of bearer aggregation or an instruction of bearer re-separation to the UE upon determining that the local eNB does not satisfy the condition of bearer separation any longer, and the UE performs a corresponding operation (for example, deletes the C-RNTI corresponding to the original local eNB) upon reception of the instruction. In the meantime, an eNB which maintain RRC connection (i.e., the macro eNB) instructs the local eNB via the interface between the eNBs to initiate a procedure of bearer aggregation or a procedure of bearer re-separation with respect to the corresponding UE. The local eNB reclaims the dedicated C-RNTI allocated for the UE being served by the local eNB and performs another corresponding operation upon reception of the instruction.

In a fourth embodiment, a macro eNB and a local eNB maintain jointly a range of RNTI values; and for bearer separation, an initial access eNB of a UE (e.g., the macro eNB) allocates a C-RNTI for use in a state of bearer separation and notifies a destination eNB (e.g., the local eNB), of the value of the C-RNTI to be used by the UE in a cell corresponding to the local eNB, through interaction via an interface between the eNBs.

Figure 7:
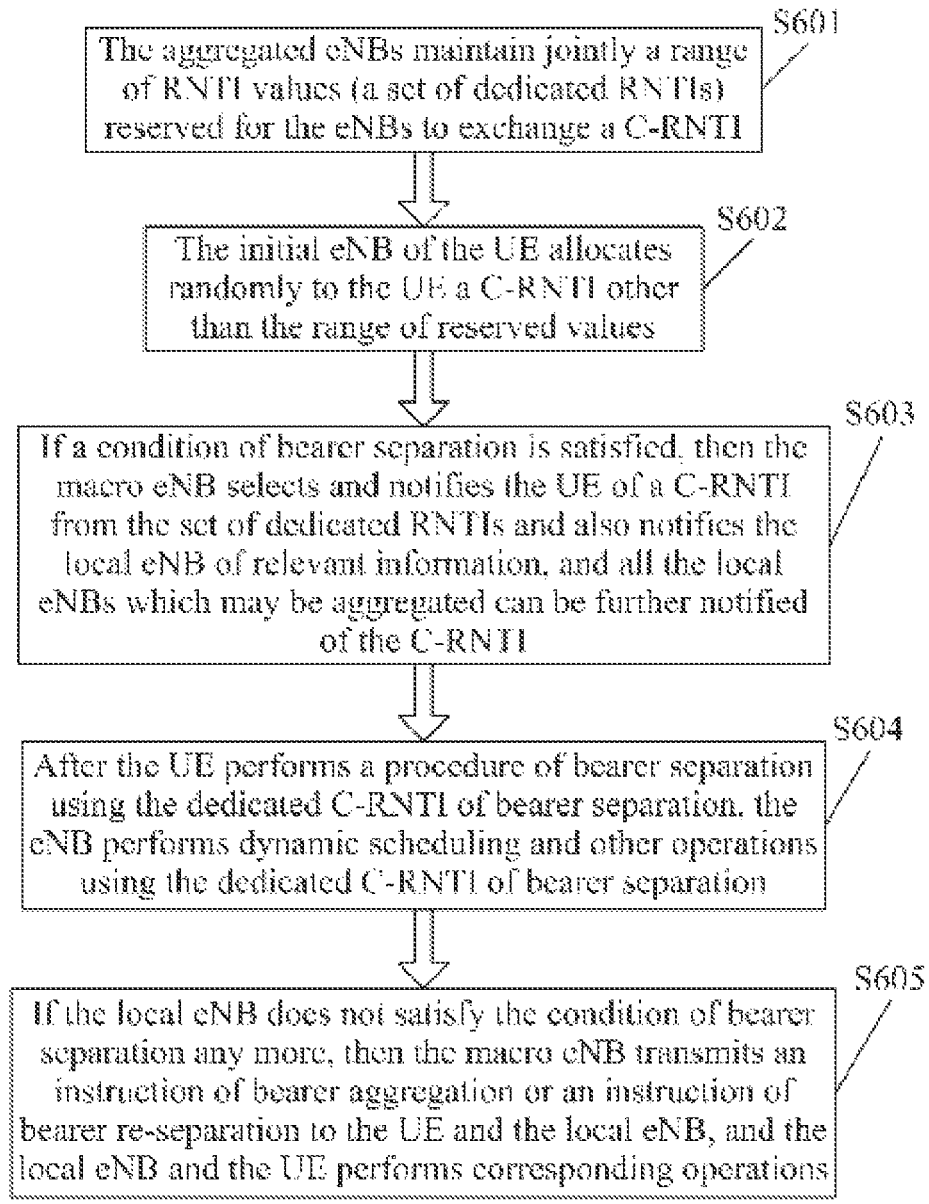
FIG. 7 is a schematic flow chart of a method for allocating a C-RNTI according to an embodiment of the invention.

Referring to FIG. 7, there are particular operations of:

S601: The interacting eNBs maintain jointly a set of dedicated RNTIs.

In order to avoid confliction in use of a C-RNTI, the aggregated eNBs maintain jointly a range of RNTI values (referred to as a set of dedicated RNTIs for bearer separation) reserved for the eNBs to exchange a C-RNTI. The set of dedicated RNTIs above maintained jointly by the eNBs can be configured by an OAM or can be exchanged via an X2 interface or an S1 interface or a newly defined interface between the local eNB and the macro eNB.

S602: The C-RNTI is initially allocated.

In the case that the macro eNB, which is the eNB initially accessed by the UE, allocates the C-RNTI for the initially accessing UE, the macro eNB allocates the C-RNTI to the UE under an existing rule, and a range of value of this C-RNTI is other than the set of dedicated RNTIs for bearer separation maintained jointly by the eNBs.

S603: The C-RNTI is allocated in bearer separation.

When a condition of bearer separation is satisfied, the macro eNB initiates a procedure of bearer separation. The macro eNB selects from the set of reserved dedicated RNTIs a C-RNTI to be used by the UE under the macro eNB and local eNB in a state of bearer separation (denoted as a dedicated C-RNTI of bearer separation) and notifies the UE of the dedicated C-RNTI of bearer separation. The notification can be performed in a procedure of RRC connection reconfiguration or in a switching process or through scheduling a C-RNTI MAC CE over a PDCCH or in another newly defined manner. In the meantime, the macro eNB notifies the local eNB of the identity of the UE, the dedicated C-RNTI of bearer separation allocated by the macro eNB for the UE, configuration of a DRB to be handed over and other information via the interface between the eNBs (and furthermore the macro eNB interacts with all the local eNBs aggregated with the macro eNB to transfer the dedicated C-RNTI of bearer separation allocated for the UE to the all the local eNBs). After the UE receives and correctly decodes the dedicated C-RNTI of bearer separation notified of by the macro eNB, the UE performs de-scrambling on the PDCCH, scrambling on the PUCCH/PUSCH and other operations using the dedicated C-RNTI of bearer separation; and the eNB performs dynamic scheduling and other operations using the dedicated C-RNTI of bearer separation in the state of bearer separation upon reception of a feedback of the UE.

The C-RNTI, which is allocated by the macro eNB to the initially accessing UE, can be reallocated by the eNB to another UE or can be reserved for the UE for subsequent use (the eNB can operate upon reception of a bearer separation completion message fed back by the UE).

S604: The C-RNTI is used.

In the state of bearer separation, the dedicated C-RNTI of bearer separation allocated by the macro eNB for the UE is applied respectively in corresponding cells of the macro eNB and the local eNB to perform dynamic scheduling and other procedures of the respective cells.

Correspondingly the UE performs de-scrambling on the PDCCH, scrambling on the PUCCH/PUSCH and other operations using the dedicated C-RNTI of bearer separation in the state of bearer separation.

S605: A procedure of bearer aggregation or re-separation is performed.

The macro eNB initiates a procedure of bearer aggregation or a procedure of bearer re-separation upon determining that the local eNB does not satisfy the condition of bearer separation any longer.

In the procedure of bearer aggregation, the macro eNB needs to determine a C-RNTI to be used by the UE after aggregation:

If the C-RNTI allocated by the macro eNB to the initially accessing UE is still reserved, then the reserved C-RNTI can be used directly as the identity of a cell of the macro eNB corresponding to the UE after aggregation; and If the C-RNTI allocated by the macro eNB to the initially accessing UE is not reserved, then the value of a C-RNTI other than the set of dedicated RNTIs of bearer separation needs to be allocated for the UE similarly to the initial access.

In the meantime, the macro eNB instructs the local eNB via the interface between the eNBs to initiate the procedure of bearer aggregation for the corresponding UE, and the dedicated C-RNTI of bearer separation previously allocated to the UE is reclaimed by the macro eNB and local eNB upon reception of the bearer separation completion message fed back by the UE (or the dedicated C-RNTI of bearer separation reserved by the local eNB can alternatively be reclaimed upon reception of the instruction of the macro eNB to initiate the procedure of bearer aggregation) (and furthermore when all the eNBs aggregated with the macro eNB are notified of the original dedicated C-RNTI of bearer separation when the macro eNB initiates bearer separation, the original dedicated C-RNTI of bearer separation is reclaimed from the other local eNBs aggregated with the macro eNB and notified of the dedicated C-RNTI of bearer separation). Correspondingly after the UE receives and correctly decodes the instruction transmitted by the macro eNB carrying the new C-RNTI, the UE performs subsequent de-scrambling on the PDCCH, scrambling on the PUCCH/PUSCH and other operations using the new C-RNTI. In the meantime, the UE deletes the dedicated C-RNTI of bearer separation. The eNB performs dynamic scheduling and other operations using the new C-RNTI upon reception of a bearer aggregation completion message fed back by the UE.

In the procedure of bearer re-separation, firstly the RB handed over in the procedure of bearer separation is handed back over to the macro eNB, and then a part/all of the DRB is handed again over to another local eNB via a new instruction of bearer separation; or a part/all of the RB handed over in the procedure of bearer separation is handed directly over to the other local eNB.

A general process of bearer re-separation with the RB being firstly handed back over to the macro eNB is the same as in the procedure of bearer aggregation. For the procedure of re-separation with the RB being handed directly over from the local eNB 1 to the local eNB 2, a new dedicated C-RNTI of bearer separation needs to be reallocated for the macro eNB and the local eNB 2 similarly to the operation S602 (and furthermore the new dedicated C-RNTI of bearer separation can be transferred to all the local eNBs aggregated with the macro eNB through interaction therewith), and the original dedicated C-RNTI of bearer separation can be reclaimed from the macro eNB and the local eNB 1 (and furthermore when all the eNBs aggregated with the macro eNB are notified of the original dedicated C-RNTI of bearer separation when the macro eNB initiates bearer separation, the original dedicated C-RNTI of bearer separation is reclaimed from the other local eNBs aggregated with the macro eNB and notified of the dedicated C-RNTI of bearer separation). (Correspondingly the UE deletes the original dedicated C-RNTI of bearer separation and thereafter applies the new dedicated C-RNTI of bearer separation. Particularly the original dedicated C-RNTI of bearer separation allocated to the UE is reclaimed by the macro eNB upon reception of the bearer re-separation completion message fed back by the UE. Correspondingly the macro eNB issues the instruction of bearer re-separation to the UE by notifying the UE of the new dedicated C-RNTI of bearer separation for subsequent use (simply a C-RNTI 1), and after the UE receives and correctly decodes the instruction carrying the C-RNTI 1, the UE performs de-scrambling on the PDCCH, scrambling on the PUCCH/PUSCH and other operations using the C-RNTI 1. In the meantime, the UE deletes the original dedicated C-RNTI of bearer separation, and the eNB performs dynamic scheduling and other operations using the C-RNTI 1 upon reception of the bearer re-separation message fed back by the UE); or when all the eNBs aggregated with the macro eNB are notified of the dedicated C-RNTI of bearer separation when the macro eNB initiates bearer separation, the local eNB 2 performs subsequent processes and operations directly using the original dedicated C-RNTI of bearer separation; or when only the aggregated destination eNB is notified of the dedicated C-RNTI of bearer separation when the macro eNB initiates bearer separation, at this time the macro eNB allocates the original dedicated C-RNTI of bearer separation directly to the local eNB 2 and can further reclaim the value of the original dedicated C-RNTI of bearer separation on the local eNB 1 (the original dedicated C-RNTI of bearer separation can be reclaimed by the local eNB 1 upon reception of the bearer re-separation completion message fed back by the UE or can be reclaimed by the local eNB 1 upon reception of the instruction of the macro eNB to initiate the procedure of bearer re-separation).

In a fifth particular embodiment, a macro eNB and a local eNB maintain jointly a range of RNTI values; and for bearer separation, an initial access eNB of a UE (e.g., the macro eNB) allocates a dedicated C-RNTI of bearer separation to a destination eNB (e.g., the local eNB) and notifies the destination eNB (e.g., the local eNB) through interaction via an interface between the eNBs. The value of a C-RNTI of a cell of the macro eNB corresponding to the UE will not be changed throughout the process.

Figure 8:
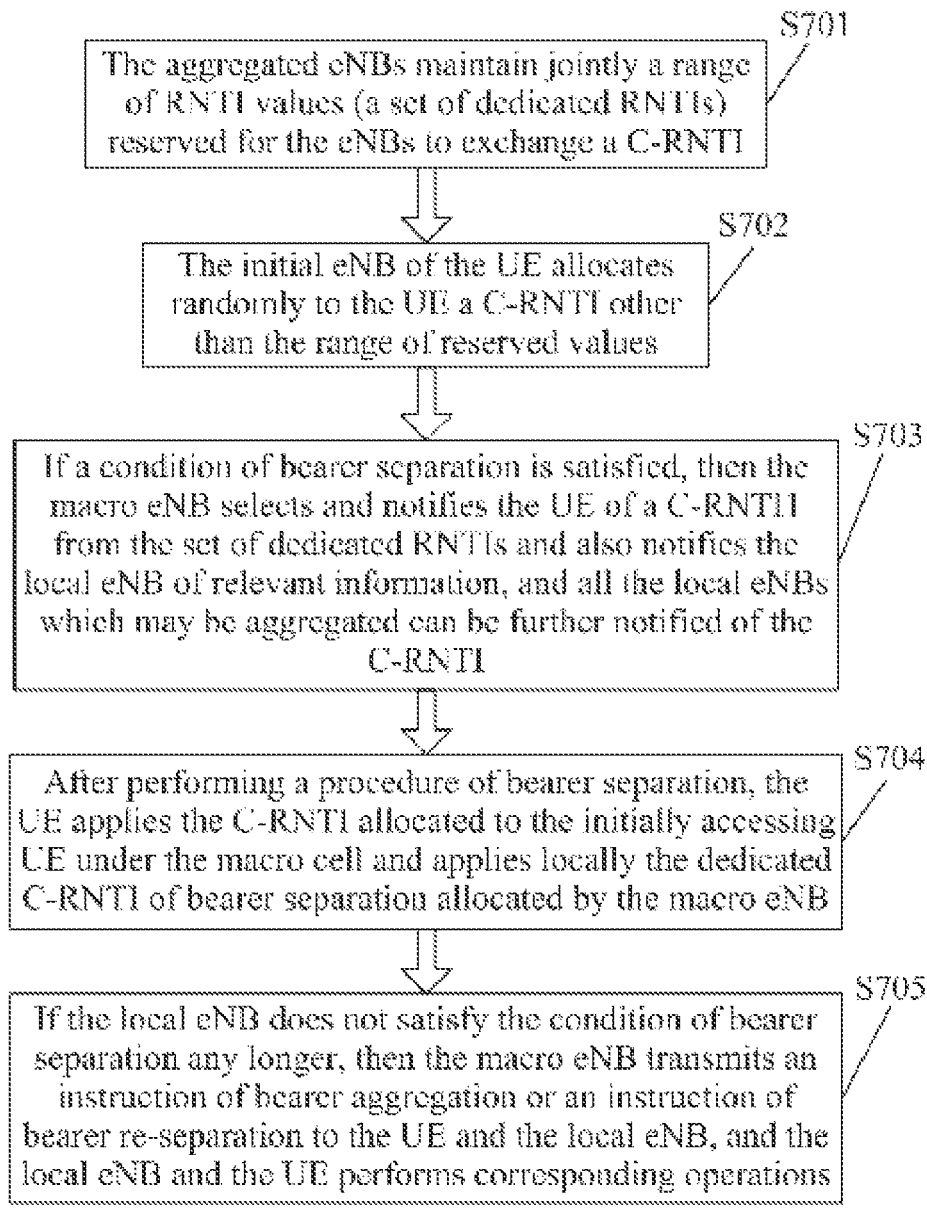
FIG. 8 is a schematic flow chart of a method for allocating a C-RNTI according to an embodiment of the invention.

Referring to FIG. 8, there are particular operations of:

S701: The interacting eNBs maintain jointly a set of dedicated RNTIs.

In order to avoid confliction in use of a C-RNTI, the aggregated eNBs maintain jointly a range of RNTI values (referred to as a set of dedicated RNTIs for bearer separation) reserved for the eNBs to exchange a C-RNTI. The set of dedicated RNTIs above maintained jointly by the eNBs can be configured by an OAM or can be exchanged via an X2 interface or an S1 interface or a newly defined interface between the local eNB and the macro eNB.

S702: The C-RNTI is initially allocated.

In the case that the macro eNB, which is the eNB initially accessed by the UE, allocates the C-RNTI to the initially accessing UE, the macro eNB can allocate the C-RNTI to the UE under an existing rule, and a range of value of this C-RNTI is other than the set of dedicated RNTIs for bearer separation maintained jointly by the eNBs.

S703: The C-RNTI is allocated in bearer separation.

When a condition of bearer separation is satisfied, the macro eNB initiates a procedure of bearer separation. The macro eNB selects from the set of reserved dedicated RNTIs a C-RNTI to be used by the UE under a corresponding cell of the local eNB in a state of bearer separation (denoted as a dedicated C-RNTI of bearer separation) and notifies the UE of the dedicated C-RNTI of bearer separation. The notification can be performed in a procedure of RRC connection reconfiguration or in another newly defined manner. In the meantime, the macro eNB notifies the local eNB of the identity of the UE, the dedicated C-RNTI of bearer separation, configuration of a DRB to be handed over and other information via the interface between the eNBs (and furthermore the macro eNB interacts with all the local eNBs aggregated with the macro eNB to transfer the dedicated C-RNTI of bearer separation allocated to the UE to the all the local eNB).

S704: The C-RNTIs are used.

In the state of bearer separation, the different C-RNTIs are applied in corresponding cells of the macro eNB and the local eNB to perform dynamic scheduling and other operations on the UE: the C-RNTI allocated to the initially accessing UE is applied to the macro eNB, and the dedicated C-RNTI of bearer separation allocated by the macro eNB is applied to the local eNB. Correspondingly the UE performs de-scrambling on the PDCCH, scrambling on the PUCCH/PUSCH and other operations using the corresponding C-RNTI's in the state of bearer separation respectively under the local eNB and macro eNB.

S705: A procedure of bearer aggregation or re-separation is performed.

The macro eNB initiates a procedure of bearer aggregation or a procedure of bearer re-separation upon determining that the local eNB does not satisfy the condition of bearer separation any longer.

In the procedure of bearer aggregation, the C-RNTI allocated to the initially accessing UE is still applied to the macro eNB. In the meantime, the macro eNB instructs the local eNB via the interface between the eNBs to initiate the procedure of bearer aggregation to the corresponding UE, and the dedicated C-RNTI of bearer separation previously allocated to the UE is reclaimed by the macro eNB and local eNB (or the dedicated C-RNTI of bearer separation can be reclaimed after the UE feeds back a bearer aggregation completion message or can be reclaimed by the local eNB upon reception of the instruction of the macro eNB to initiate the procedure of bearer aggregation) (and furthermore when all the eNBs aggregated with the macro eNB are notified of the original dedicated C-RNTI of bearer separation when the macro eNB initiates bearer separation, the original dedicated C-RNTI of bearer separation is reclaimed from the other local eNBs aggregated with the macro eNB and notified of the dedicated C-RNTI of bearer separation). Correspondingly after the UE feeds back the bearer aggregation completion message or after the UE receives and correctly decodes the bearer aggregation instruction transmitted by the macro eNB, the UE deletes the dedicated C-RNTI of bearer separation.

A general process of bearer re-separation with the RB being firstly handed back over to the macro eNB is the same as in the procedure of bearer aggregation; and in the procedure of re-separation with the RB being handed directly over from the local eNB 1 to the local eNB 2, a new dedicated C-RNTI of bearer separation needs to be reallocated for the local eNB 2 similarly to the operation S702 (and furthermore the new dedicated C-RNTI of bearer separation can be transferred to all the local eNBs aggregated with the macro eNB through interaction therewith), and the original dedicated C-RNTI of bearer separation can be reclaimed from the macro eNB and the local eNB 1 (and furthermore when all the eNBs aggregated with the macro eNB are notified of the original dedicated C-RNTI of bearer separation when the macro eNB initiates bearer separation, the original dedicated C-RNTI of bearer separation is reclaimed from the other local eNBs aggregated with the macro eNB and notified of the dedicated C-RNTI of bearer separation). (Correspondingly the UE deletes the original dedicated C-RNTI of bearer separation and thereafter applies the new dedicated C-RNTI of bearer separation. Reference can be made to the description of the fourth embodiment for details thereof); or in the case that all the eNBs aggregated with the macro eNB are notified of the dedicated C-RNTI of bearer separation when the macro eNB initiates bearer separation, the local eNB 2 performs subsequent processes and operations directly using the original dedicated C-RNTI of bearer separation; or in the case that only the aggregated destination eNB is notified of the dedicated C-RNTI of bearer separation when the macro eNB initiates bearer separation, at this time the macro eNB allocates the original dedicated C-RNTI of bearer separation directly to the local eNB 2 and can further reclaim the value of the original dedicated C-RNTI of bearer separation on the local eNB 1 (the original dedicated C-RNTI of bearer separation can be reclaimed by the local eNB 1 upon reception of the bearer re-separation completion message fed back by the UE or can be reclaimed by the local eNB 1 upon reception of the instruction of the macro eNB to initiate the procedure of bearer re-separation).

In a sixth embodiment, a macro eNB and a local eNB maintain jointly a range of RNTI values; and an eNB initially accessed by a UE (e.g., the macro eNB) allocates a C-RNTI to be used by the UE in a state of bearer separation at the beginning of a connection setup and notifies a destination eNB (e.g., the local eNB), of the value of the C-RNTI to be used by the UE in a cell corresponding to the local eNB, through interaction via an interface between the eNBs after the UE sets up the RRC connection.

Figure 9:
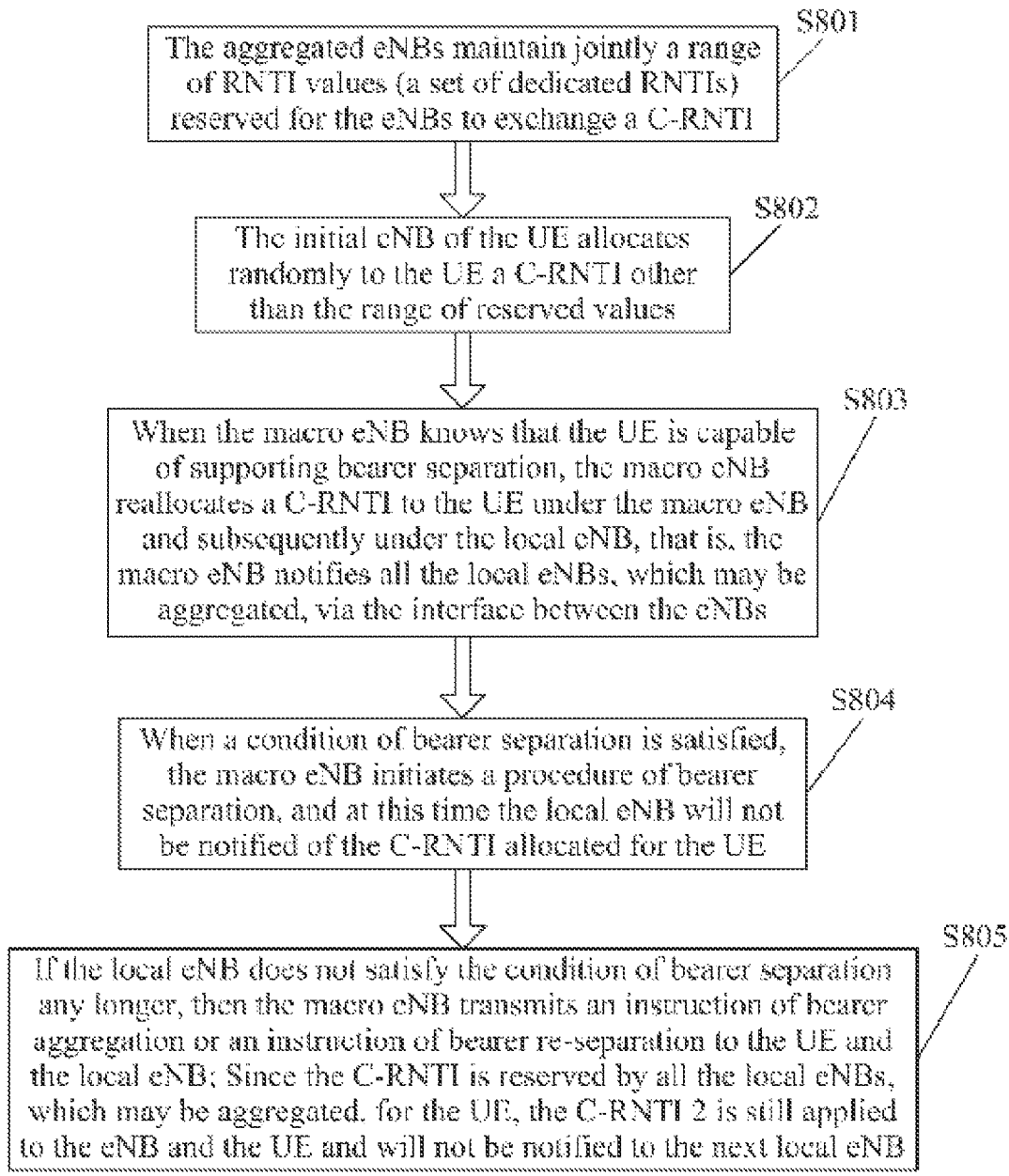
FIG. 9 is a schematic flow chart of a method for allocating a C-RNTI according to an embodiment of the invention.

Referring to FIG. 9, there are particular operations of:

S801: The interacting eNBs maintain jointly a set of dedicated RNTIs.

In order to avoid confliction in use of a C-RNTI, the aggregated eNBs maintain jointly a range of RNTI values (referred to as a set of dedicated RNTIs for bearer separation) reserved for the eNBs to exchange a C-RNTI. The set of dedicated RNTIs for bearer separation above can be configured by an OAM or can be exchanged via an X2 interface or an S1 interface or a newly defined interface between the local eNB and the macro eNB.

S802: The C-RNTI is initially allocated.

In the case that the macro eNB allocates the C-RNTI for the initially accessing UE, the macro eNB can allocate the C-RNTI (denoted as a C-RNTI 1) for the UE under an existing rule, and a range of values of this C-RNTI is other than the set of dedicated RNTIs for bearer separation.

803: A dedicated C-RNTI of bearer separation is pre-allocated.

After the RRC connection is set up and when the macro eNB knows that the UE is capable of supporting bearer separation, the macro eNB reallocates a C-RNTI for the UE to be used under the macro eNB and subsequently under the local eNB (denoted as a C-RNTI 2 and belonging to the set of dedicated RNTIs for bearer separation). After the C-RNTI 2 is allocated, the macro eNB notifies all the local eNBs, which may be aggregated, of the C-RNTI 2 together with the identity of the UE via the interface between the eNBs. In the meantime, the macro eNB notifies the UE of the change of the C-RNTI to be used from the C-RNTI 1 to the C-RNTI 2 (and thereafter the C-RNTI 1 can be allocated to another UE). After the UE receives and successfully decodes the C-RNTI 2 notified of by the macro eNB, the UE performs subsequent de-scrambling on the PDCCH, scrambling on the PUCCH/PUSCH and other operations using the C-RNTI 2.

When a condition of bearer separation is satisfied, the macro eNB initiates a procedure of bearer separation. The macro eNB notifies the local eNB of the identity of the UE, configuration of a DRB to be handed over and other information via the interface between the eNBs; and at this time the local eNB will not be notified of the C-RNTI allocated for the UE.

S804: The C-RNTI is used.

In a state of bearer separation, the UE performs relevant operations under both the macro eNB and the local eNB using the C-RNTI 2. Correspondingly in the state of bearer separation, the UE performs de-scrambling on the PDCCH, scrambling on the PUCCH/PUSCH and other operations using the C-RNTI 2.

S805: The C-RNTI is changed.

The macro eNB initiates a procedure of bearer aggregation or a procedure of bearer re-separation upon determining that the local eNB does not satisfy the condition of bearer separation any longer.

The C-RNTI 2 is still applied to the macro eNB in the procedure of bearer aggregation, the procedure of bearer re-separation with the RB being firstly handed back over to the macro eNB and the procedure of bearer re-separation with the RB being handed over directly from the local eNB 1 to the local eNB 2. Correspondingly the UE performs corresponding de-scrambling on the PDCCH, scrambling on the PUCCH/PUSCH and other operations using the C-RNTI 2.

In the procedure of bearer re-separation with the RB being handed over directly from the local eNB 1 to the local eNB 2, all the local eNBs, which may be aggregated, reserve the C-RNTI 2 for the UE after the macro eNB allocates the C-RNTI 2 as per the capability of the UE, so at this time the local eNB 2 will not be notified of the value of the C-RNTI of the UE.

In a seventh embodiment, a macro eNB and a local eNB maintain jointly a range of RNTI values; and an eNB initially accessed by a UE (e.g., the local eNB) allocates a C-RNTI to be used by the UE for use in a state of bearer separation at the beginning of a connection setup and notifies a destination eNB (e.g., macro local eNB), of the value of the C-RNTI to be used by the UE in a cell corresponding to the local eNB, through interaction via an interface between the eNBs after the UE sets up the RRC connection.

Figure 10:
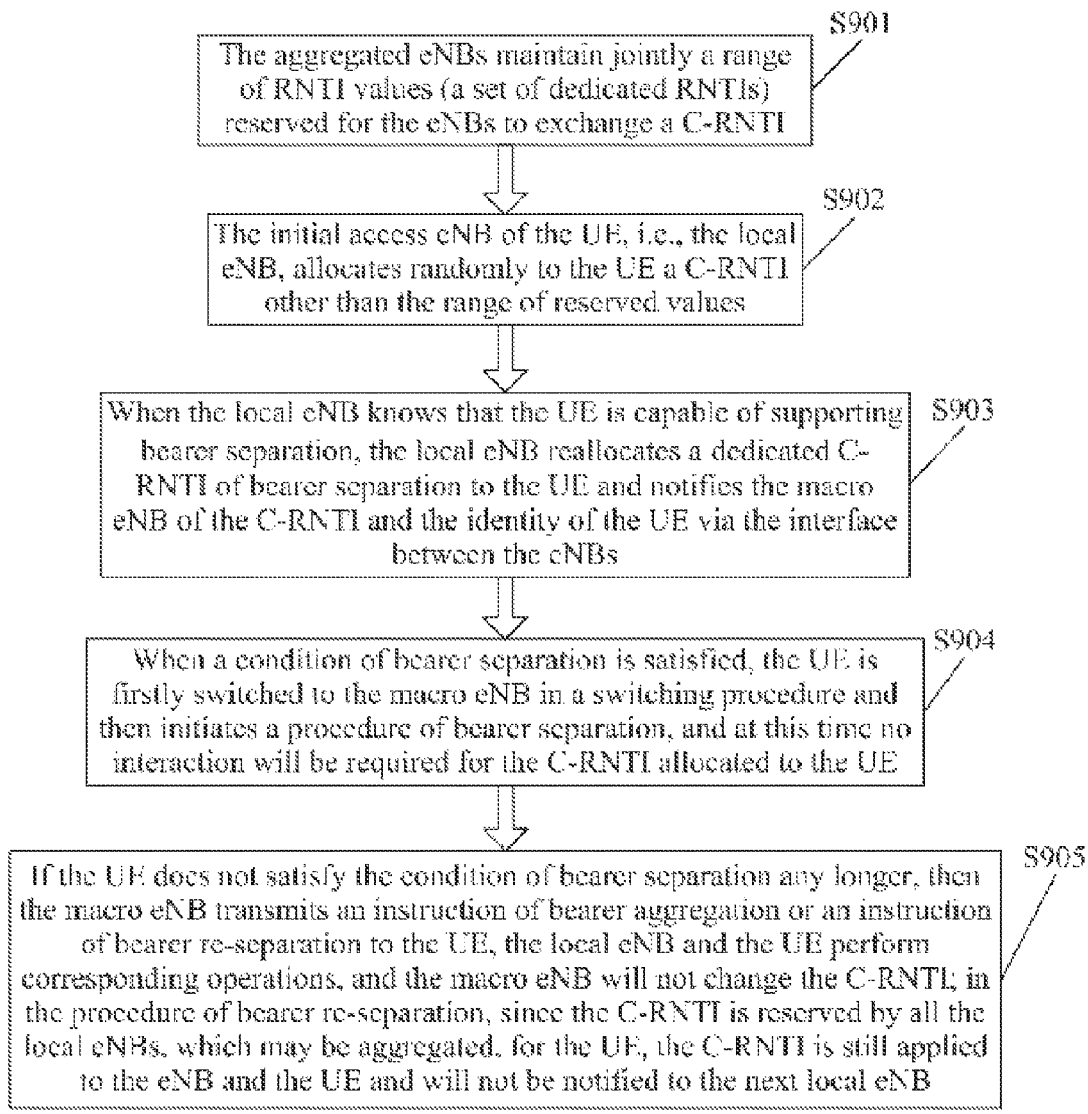
FIG. 10 is a schematic flow chart of a method for allocating a C-RNTI according to an embodiment of the invention.

Referring to FIG. 10, there are particular operations of:

S901: The interacting eNBs maintain jointly a set of dedicated RNTIs.

In order to avoid confliction in use of a C-RNTI, the aggregated eNBs maintain jointly a range of RNTI values (referred to as a set of dedicated RNTIs for bearer separation) reserved for the eNBs to exchange a C-RNTI. The set of dedicated RNTIs for bearer separation above can be configured by an OAM or can be exchanged via an X2 interface or an S1 interface or a newly defined interface between the local eNB and the macro eNB.

S902: The C-RNTI is initially allocated.

In the case that the local eNB allocates the C-RNTI for the initially accessing UE, the local eNB can allocate the C-RNTI (denoted as a C-RNTI 1) for the UE under an existing rule, and a range of values of this C-RNTI is other than the set of dedicated RNTIs for bearer separation.

S903: A dedicated C-RNTI of bearer separation is pre-allocated.

After the RRC connection is set up and when the local eNB knows that the UE is capable of supporting bearer separation, the local eNB reallocates a C-RNTI for the UE to be used under the local eNB and subsequently under the macro eNB (denoted as a C-RNTI 2 and belonging to the set of dedicated RNTIs for bearer separation). After the C-RNTI 2 is allocated, the local eNB notifies the macro eNB of the C-RNTI 2 (and the macro eNB further notifies the other local eNB aggregated therewith) together with the identity of the UE via the interface between the eNBs, and in the meantime, the local eNB notifies the UE of the change of the C-RNTI to be used from the C-RNTI 1 to the C-RNTI 2 (and thereafter the C-RNTI 1 can be allocated to another UE). After the UE receives and successfully decodes the C-RNTI 2 notified of by the macro eNB, the UE performs subsequent de-scrambling on the PDCCH, scrambling on the PUCCH/PUSCH and other operations using the C-RNTI 2.

When a condition of bearer separation is satisfied, firstly the local eNB switches the UE to the macro eNB in a switching procedure, and then the macro eNB initiates a procedure of bearer separation. At this time no interaction will be required for the dedicated C-RNTI of bearer separation allocated for the UE.

S904: The C-RNTI is used.

In a state of bearer separation, the UE performs relevant operations under both the macro eNB and the local eNB using the C-RNTI 2. Correspondingly in the state of bearer separation, the UE performs de-scrambling on the PDCCH, scrambling on the PUCCH/PUSCH and other operations using the C-RNTI 2.

S905: The C-RNTI is changed.

The macro eNB initiates a procedure of bearer aggregation or a procedure of bearer re-separation upon determining that the local eNB does not satisfy the condition of bearer separation any longer.

The C-RNTI 2 is still applied to the macro eNB in the procedure of bearer aggregation, the procedure of bearer re-separation with the RB being firstly handed back over to the macro eNB and the procedure of bearer re-separation with the RB being handed over directly from the local eNB 1 to the local eNB 2. Correspondingly the UE performs corresponding de-scrambling on the PDCCH, scrambling on the PUCCH/PUSCH and other operations using the C-RNTI 2.

In the procedure of bearer re-separation with the RB being handed over directly from the local eNB 1 to the local eNB 2, all the local eNBs, which may be aggregated, reserve the C-RNTI 2 for the UE after the eNB allocates and exchange the C-RNTI 2 as per the capability of the UE, so at this time the local eNB 2 will not be notified of the value of the C-RNTI of the UE.

An embodiment of the invention provides a system for allocating a C-RNTI, the system including an initial access eNB of the UE and a destination eNB aggregated for the UE; and Each eNB is configured to allocate a C-RNTI corresponding to the eNB respectively to the User Equipment (UE) in a scenario where cell resources of the a plurality of eNBs are aggregated for the UE.

Preferably the scenario is a scenario of layered network deployment where bearer separation is supported.

In the scenario of layered network deployment where bearer separation is supported, the aggregated destination eNB is configured, in a procedure of bearer separation, to allocate to the UE the C-RNTI of a cell of the aggregated destination eNB and to notify the UE of the C-RNTI through the initial access eNB of the UE; or in the procedure of bearer separation and in a random access procedure initiated by the UE to the aggregated destination eNB, to allocate the C-RNTI corresponding to the eNB to the UE and to notify the UE of the C-RNTI.

Figure 11A:
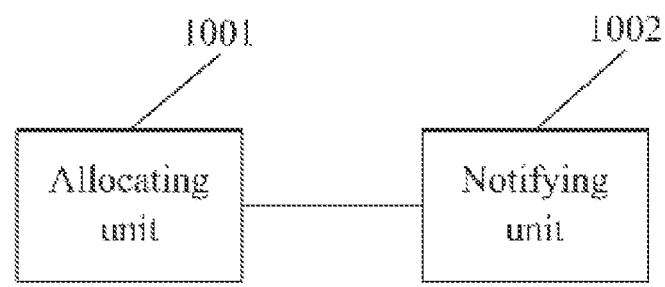
FIG. 11A is a schematic functional structural diagram of an initial access eNB according to an embodiment of the invention.

An embodiment of the invention provides an eNB as illustrated in FIG. 11A, the eNB including:

An allocating unit 1001 configured, in a scenario where cell resources of a plurality of eNBs are aggregated for a UE, to allocate to the UE a dedicated C-RNTI of bearer separation, the dedicated C-RNTI of bearer separation belongs to a set of dedicated C-RNTIs of bearer separation maintained jointly by the eNBs aggregated for the UE; and A notifying unit 1002 is configured to notify the UE and another eNB aggregated with the eNB of the dedicated C-RNTI of bearer separation.

Preferably the scenario is a scenario of layered network deployment where bearer separation is supported.

The allocating unit 1001 is configured:

In the scenario of layered network deployment where bearer separation is supported, to allocate to the UE the C-RNTI for use in bearer separation when an initial RRC connection is set up; or to allocate to the UE the C-RNTI for use in bearer separation in a procedure of bearer separation.

Preferably the eNB is an initial access eNB.

Preferably the eNB may be a macro eNB or a local eNB.

Preferably in a state of bearer separation, the aggregated destination eNB communicates using the C-RNTI allocated by the initial access eNB to the UE for use in the state of bearer separation, and the initial access eNB also communicates using the allocated C-RNTI; or in the state of bearer separation, the aggregated destination eNB communicates using the C-RNTI allocated by the initial access eNB to the UE for use in the state of bearer separation, and the initial access eNB still communicates using a C-RNTI by the initial access eNB allocated to the UE in a procedure of initial connection setup initiated by the UE.

Figure 11B:
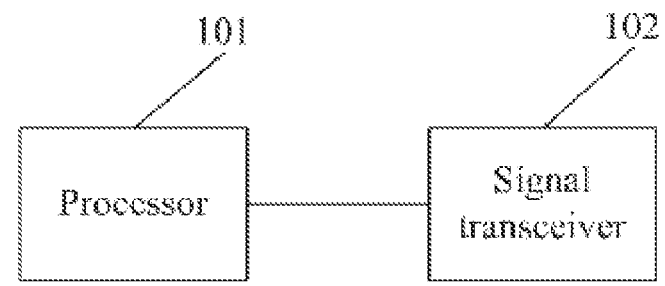
FIG. 11B is a schematic physical structural diagram of an initial access eNB according to an embodiment of the invention.

In hardware, the allocating unit 1001 can be a processor, and the notifying unit 1002 can be a signal transceiver including transmit and receive antennas and other components, and at this time, an eNB as illustrated in FIG. 11B, the eNB including:

A processor 101 configured, in a scenario where cell resources of a plurality of eNBs are aggregated for a UE, to allocate to the UE a dedicated C-RNTI of bearer separation, where the dedicated C-RNTI of bearer separation belongs to a set of dedicated C-RNTIs of bearer separation maintained jointly by the eNBs aggregated for the UE; and A signal transceiver 102 is configured to notify the UE and another eNB aggregated with the eNB of the dedicated C-RNTI of bearer separation.

Preferably the scenario is a scenario of layered network deployment where bearer separation is supported.

The processor 101 is configured:

In the scenario of layered network deployment where bearer separation is supported, to allocate to the UE the C-RNTI for use in bearer separation when an initial RRC connection is set up; or to allocate to the UE the C-RNTI for use in bearer separation in a procedure of bearer separation.

Preferably the eNB is an initial access eNB.

Preferably the eNB may be a macro eNB or a local eNB.

Preferably in a state of bearer separation, the aggregated destination eNB communicates using the C-RNTI allocated by the initial access eNB to the UE for use in the state of bearer separation, and the initial access eNB also communicates using the allocated C-RNTI; or in the state of bearer separation, the aggregated destination eNB communicates using the C-RNTI allocated by the initial access eNB to the UE for use in the state of bearer separation, and the initial access eNB still communicates using a C-RNTI by the initial access eNB allocated for the UE in a procedure of initial connection setup initiated by the UE.

In summary, the invention discloses a method for allocating C-RNTIs to a UE, by different eNBs aggregated for the UE, for dynamic scheduling and other procedures on the UE in the scenario of layered network deployment where cell resources of a plurality of eNBs are aggregated for the UE, particularly in a scenario of layered network deployment where bearer separation is supported.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for allocating a Cell-Radio Network Temporary Identity (C-RNTI) in a scenario where cell resources of a plurality of base stations are aggregated for a User Equipment (UE), wherein the method comprises:
   allocating, by an initial access base station, to the UE a dedicated C-RNTI of bearer separation for use in a state of bearer separation, wherein the dedicated C-RNTI of bearer separation belongs to a set of dedicated Radio Network Temporary Identities (RNTIs) of bearer separation maintained jointly by the base stations aggregated for the UE, wherein the set of dedicated RNTIs for bearer separation comprises a range of RNTI values maintained jointly by the aggregated base stations and reserved for the base stations to exchange a C-RNTI; and
   notifying, by the initial access base station, the UE and a base station aggregated with the initial access base station respectively of the dedicated C-RNTI.

2. The method according to claim 1, wherein the scenario is a scenario of layered network deployment where bearer separation is supported.

3. The method according to claim 2, wherein allocating, by the initial access base station, the dedicated C-RNTI of bearer separation to the UE comprises:
   allocating, by the initial access base station, the dedicated C-RNTI of bearer separation to the UE when an initial Radio Resource Control (RRC) connection is set up or in a procedure of bearer separation.

4. The method according to claim 3, wherein the method further comprises:
   in the state of bearer separation, communicating, by the base stations aggregated for the UE, using the dedicated C-RNTI of bearer separation; or
   communicating, by the initial access base station among the base stations aggregated for the UE, using a C-RNTI by the initial access base station allocated to the UE in a procedure of initial connection setup initiated by the UE, and communicating, by the base stations aggregated for the UE other than the initial access base station, using the dedicated C-RNTI of bearer separation.

5. The method according to claim 1, wherein the initial access base station is a macro base station or a local base station.

6. A method for allocating a Cell-Radio Network Temporary Identity (C-RNTI) in a scenario where cell resources of a plurality of base stations are aggregated for a User Equipment (UE), wherein the method comprises:
   determining, by an initial access base station of the UE and a destination base station aggregated for the UE, C-RNTIs to be allocated by the initial access base station and the destination base station to the UE respectively; and
   notifying, by the initial access base station of the UE and the destination base station aggregated for the UE, to the UE respectively, the C-RNTIs determined by the initial access base station and the destination base station respectively, so that in a state of bearer separation, the initial access base station of the UE and the destination base station aggregated for the UE perform dynamic scheduling respectively using the C-RNTI.

7. The method according to claim 6, wherein the scenario is a scenario of layered network deployment where bearer separation is supported.

8. The method according to claim 7, wherein notifying, by the destination base station aggregated for the UE, the C-RNTI to the UE comprises:
   in the procedure of bearer separation and in a random access procedure initiated by the destination base station aggregated for the UE, allocating, by the destination base station aggregated for the UE, the C-RNTI corresponding to the destination base station to the UE and notifying the UE of the C-RNTI.

9. A system for allocating a Cell-Radio Network Temporary Identity (C-RNTI), wherein the system comprises an initial access base station of a User Equipment (UE) and a destination base station aggregated for the UE, wherein:
   each base station is configured to notify a C-RNTI allocated corresponding to the base station respectively to the UE in a scenario where cell resources of a plurality of base stations are aggregated for the UE, so that in a state of bearer separation, the initial access base station of the UE and the destination base station aggregated for the UE perform dynamic scheduling respectively using the C-RNTI.

10. The system according to claim 9, wherein the scenario is a scenario of layered network deployment where bearer separation is supported.

11. The system according to claim 10, wherein the destination base station aggregated is configured:
   in the procedure of bearer separation and in a random access procedure initiated by the UE to the aggregated destination base station, to allocate the C-RNTI corresponding to the destination base station to the UE and to notify the UE of the C-RNTI.

* * * * *